(No Model.)
W. V. BREENE & E. W. BROWN.
THILL COUPLING.
No. 585,180. Patented June 29, 1897.
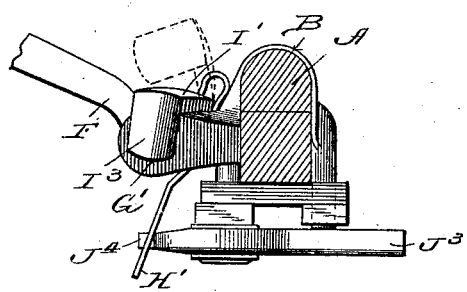
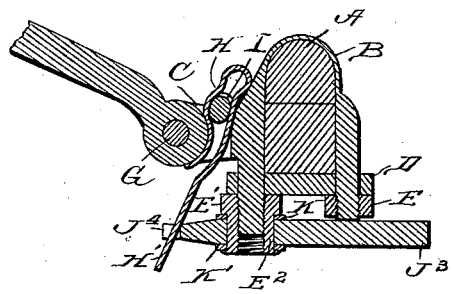
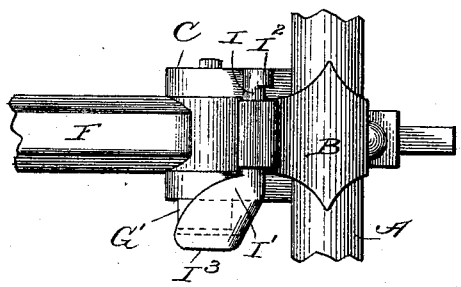
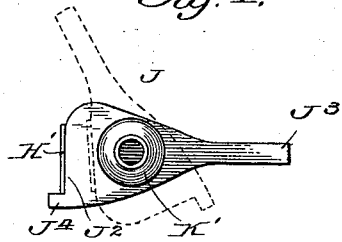
WITNESSES:
Harry S. Rohrer
Geo. M. Copenhaver.
INVENTORS
Edward W. Brown
William V. Breene
BY
Niles & Greene,
ATTORNEYS.

UNITED STATES PATENT OFFICE.

WILLIAM V. BREENE AND EDWARD W. BROWN, OF PORT CHESTER, NEW YORK.

THILL-COUPLING.

SPECIFICATION forming part of Letters Patent No. 585,180, dated June 29, 1897.

Application filed November 9, 1896. Serial No. 611,450. (No model.)

*To all whom it may concern:*

Be it known that we, WILLIAM V. BREENE and EDWARD W. BROWN, residents of Port Chester, in the county of Westchester and State of New York, have invented certain new and useful Improvements in Thill-Couplings; and we do hereby declare the following to be a full, clear, and exact description of the invention, such as will enable others skilled in the art to which it pertains to make and use the same.

The object of the invention is to furnish devices that may be readily applied to ordinary thill-couplings and that when so applied will prevent rattling, that will lock every part against accidental detachment, and that will permit quickly attaching and detaching the thills without the use of a wrench, hammer, or any tool whatever.

In the drawings, Figure 1 is a side view of the coupling in place. Fig. 2 is a top plan of the same. Fig. 3 is a section at 3 3, Fig. 2. Fig. 4 is a bottom plan showing a part of the devices of the other figures.

In the drawings, A represents an axle upon which is a clip consisting of a body B, yoke C, bar D, and nuts E E'.

F is a thill-iron held in the yoke by a bolt G passing through both the iron and the yoke. The bolt G is threadless and the nut E' is of unusual construction, but in other respects the parts thus far named are wholly without novelty. Within the yoke and between the iron F and the body of the clip is a spring formed by bending a flat bar into a loop having branches or arms of unequal length. The bend of the loop is at some distance above the yoke, and the two branches H H' are normally divergent and extend downward, fitting in the space in the rear of the cylindrical end portion of the thill-iron. The shorter front branch is bent to fit that portion, and just above the yoke one of the branches is curved outward to form a bearing for a flattened transverse rotary rod I, having at one end an enlargement I', which prevents its advancing in its bearing, and at the other a projection I², which prevents its withdrawal except when it is turned into a certain position. From the enlargement I' depends a lip I³ in front of the axial line of the rod and contiguous to the outer or end face of the bolt-head G'. The longer branch of the loop extends below the axle, and were it not pushed forward from a nearly vertical position the spring would exert little or no force upon the thill-iron. The nut E' has upon its lower side a boss E², and upon this is mounted a lever J, whose straight end face J² is much farther from the boss upon which the lever swings than is its lateral faces. The two faces just mentioned are practically continuous, the angle of the lever being rounded, and this end of the lever forms in effect a sort of cam rotated by means of the narrow rearwardly-extending end J³ of the lever, which swings in close proximity to the nut E. The broad end of the lever has at one side a projection J⁴, for purposes that will appear. Preferably the boss E² is tubular, as shown, and upon it is placed a washer K to prevent the turning of the nut by the friction of the lever. The latter is perforated and passed over the boss, a second washer K' is added, and the end of the boss is swaged out upon the outer washer, so that the lever is permanently secured in place. It is obvious that this construction need not be minutely followed, but it is a convenient way of mounting the lever to swing just below the plane of the nuts without making their removal difficult. Now if the lever be turned to the position suggested in dotted lines, the depending end of the spring lies alongside its lateral face, but exerts little or no pressure upon it. When it is in such position, either nut E or E' may be removed, the latter carrying with it the lever, should such removal for any reason be desired. The rod I, being in such case not gripped by the spring-arms, which form its bearing, is also free to rotate, and if it be turned to the position shown in dotted lines in Fig. 1 the lip swings up out of the path of the bolt G, and the latter may be withdrawn with the fingers, leaving the thills or pole free. When it is so swung, the bolt, owing to its flattened form, binds enough to prevent automatic return. When the thills are to be attached, the operation is reversed, the thill-iron being first placed in position, the bolt (which is a mere headed pin) is inserted, the rod I is rotated, bringing the lip down over the head of the bolt, so that the latter cannot be withdrawn, and, lastly, the lever is swung to the position shown in full lines in Fig. 4. In passing to this position the lever forces the spring-arm far forward from its normal position, bringing the two arms close together and gripping the rod I between them, so that its accidental turning is impossible in view of its flattened form. The elastic force of the spring at the same time presses its front arm upon the thill-iron and its rear arm against the end face of the lever. The lever then is locked against accidental turning, and the pressure transmitted through the boss upon which it turns to the nut above it tends to incline the latter, and thus locks it, if, indeed, it were not otherwise locked by the friction of the lever on its boss. The narrow end of the lever lies just below the other nut E, and the removal of that nut is impossible while the lever remains in its locking position. All the novel parts and all the ordinary parts are thus secure against displacement, although all are freed by merely swinging a lever ninety degrees.

It would of course be possible to swing the lever in either direction, but we prefer to swing it in one direction only and to provide it with the projection $J^4$, which prevents its swinging beyond the proper point.

When these novel devices are to be applied to an ordinary coupling, it is only necessary to discard the usual nut on the bolt G and the forward one of the two clip-nuts.

What we claim is—

1. In an antirattling device for attachment to an ordinary thill-coupler, a lever pivotally mounted upon one of the clip-nuts and provided with a cam-like end to press and impart tension to a suitable antirattling spring.

2. In an antirattling device for attachment to an ordinary thill-coupling, the combination with a looped spring adapted for insertion between the thill-iron and the clip, of a flattened rod revolubly held between the branches of the spring-loop and provided with a lip at one side of its axis to swing into and out of the withdrawal path of the thill-retaining bolt.

3. The combination with a thill-coupling, of a spring lying between the thill-iron and clip-body and projecting below the latter, and a cam-lever pivoted upon one clip branch to swing into position over the end of the other clip branch and adapted, when in such position, to hold the lower end of said spring in front of its normal position and thus bind the thill-iron.

4. The combination with an ordinary clip and thill-iron, of a spring-loop projecting downward between the two, the flattened rod between the loop branches and provided with the lip for retaining the thill-iron bolt, the cam-lever pivoted upon one branch of the clip and having a non-circular end adapted to force the rear loop branch forward when properly turned and arranged to prevent the removal of the nut from the other clip branch, but only when thus turned.

5. The combination with an ordinary thill-coupling, of a spring lying between the thill-iron and the body of the clip and projecting below the latter, the clip-nut provided with the downwardly-projecting boss, a cam-lever pivoted upon said boss and adapted by its form to force forward, and to be locked by, the lower end of said spring when itself properly turned and to cover the end of the other clip branch and prevent the removal of the nut, but only when so turned.

6. The combination with the clip provided with the usual thill-retaining yoke and nut-retained bar across the depending ends of the clip, of a lever, having a cam-like end, pivoted upon one of the clip-nuts, and an antirattling spring lying in said yoke and projecting into the path of said cam-like end, whereby the lever when swung into position below both nuts may prevent removal of the nuts and also impart tension to the spring.

In testimony whereof we have signed this specification in the presence of two subscribing witnesses.

WILLIAM V. BREENE.
EDWARD W. BROWN.

Witnesses:
GEORGE F. HINMAN,
D. S. ARMAN.